(12) United States Patent
Takahashi

(10) Patent No.: US 11,798,315 B2
(45) Date of Patent: Oct. 24, 2023

(54) ELECTRONIC DEVICE

(71) Applicant: Japan Display Inc., Tokyo (JP)

(72) Inventor: Yasuhiro Takahashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/664,713

(22) Filed: May 24, 2022

(65) Prior Publication Data

US 2022/0398863 A1 Dec. 15, 2022

(30) Foreign Application Priority Data

Jun. 11, 2021 (JP) ................. 2021-098159

(51) Int. Cl.
*G06V 40/13* (2022.01)
*G02B 3/00* (2006.01)

(52) U.S. Cl.
CPC ....... *G06V 40/1324* (2022.01); *G02B 3/0056* (2013.01)

(58) Field of Classification Search
CPC .................................................. G06V 40/13
See application file for complete search history.

(56) References Cited

U.S. PATENT DOCUMENTS

| 2018/0150671 | A1 | 5/2018 | Choo et al. |
| 2021/0409581 | A1* | 12/2021 | Hai ........................ H10K 59/65 |
| 2022/0050987 | A1* | 2/2022 | Chiu ................. H01L 27/14678 |

FOREIGN PATENT DOCUMENTS

JP 2018-87973 A 6/2018

* cited by examiner

*Primary Examiner* — Joseph R Haley
(74) *Attorney, Agent, or Firm* — Maier & Maier, PLLC

(57) ABSTRACT

According to one embodiment, an electronic device comprises a plurality of microlenses arranged in a hexagonal periodic structure, and provided in the plurality of sensor regions, and a plurality of spacers between the plurality of sensor regions, wherein the plurality of sensor regions include a first sensor region adjacent to the plurality of spacers, a second sensor region adjacent to the first sensor region in the first direction, and a third sensor region adjacent to the first sensor region in the second direction, and include at least one microlens overlapped with the first sensor region and the second sensor region, and at least one microlens overlapped with the first sensor region and the third sensor region.

10 Claims, 16 Drawing Sheets

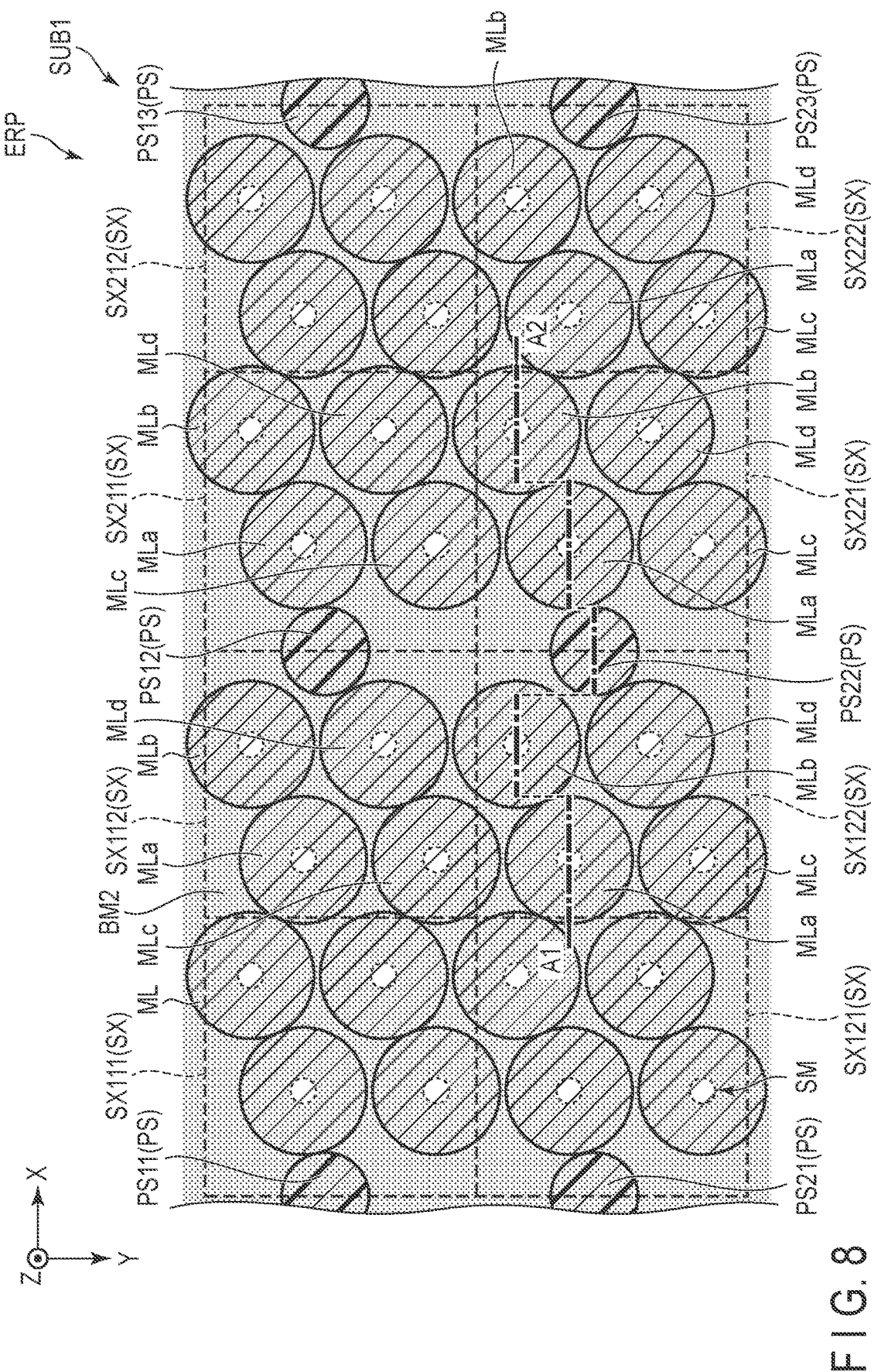
F I G. 8

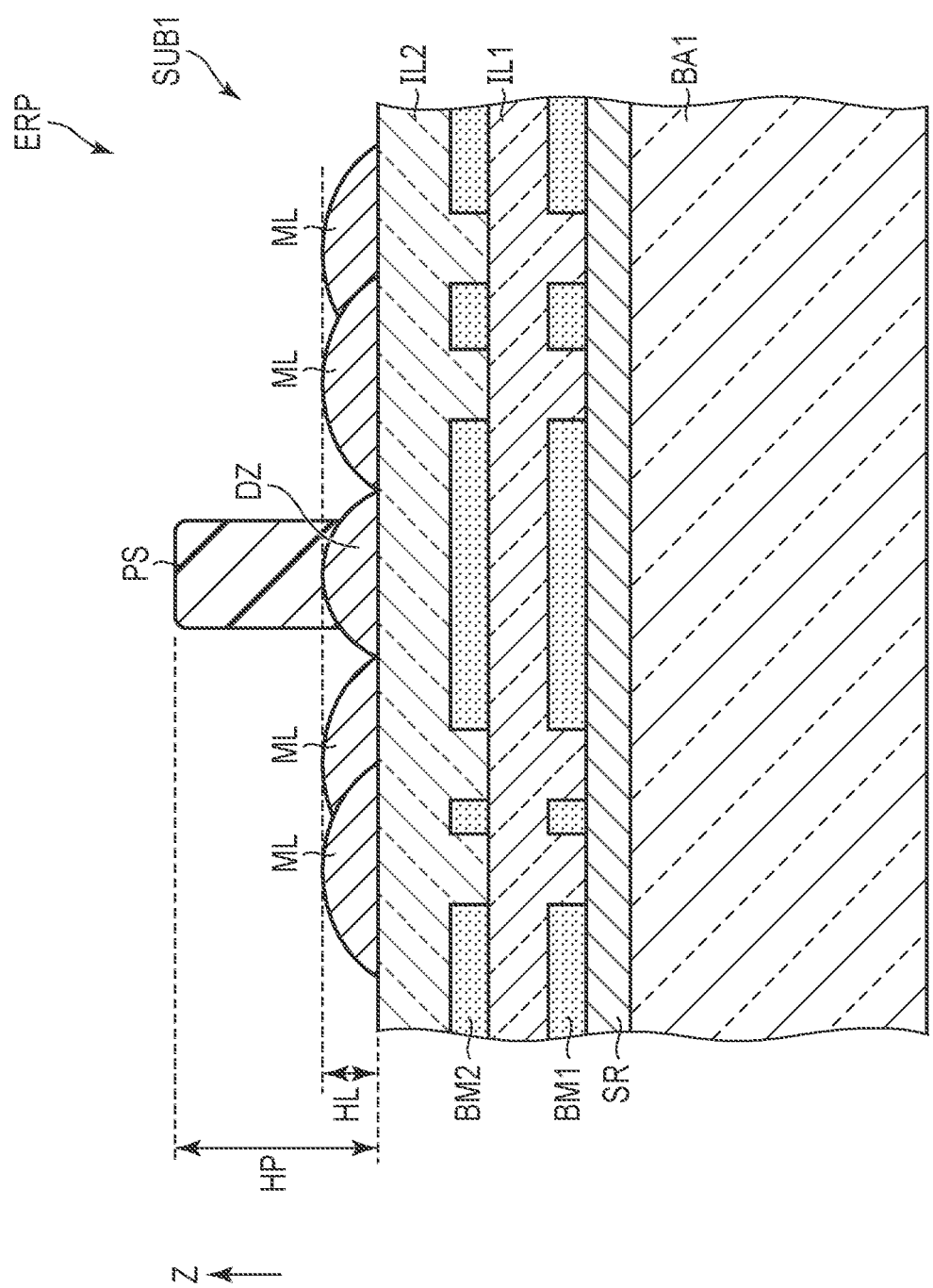
F I G. 14

ELECTRONIC DEVICE

CROSS-REFERENCE TO RELATED APPLICATIONS

This application is based upon and claims the benefit of priority from Japanese Patent Application No. 2021-098159, filed Jun. 11, 2021, the entire contents of which are incorporated herein by reference.

FIELD

Embodiments described herein relate generally to electronic devices.

BACKGROUND

In recent years, authentication systems may sometimes be installed in electronic devices to restrict access to the electronic devices. Biometric sensors are sometimes used in authentication systems. Optical biometric sensors are known as biometric sensors used for personal authentication and other purposes. Fingerprint sensors and vein sensors are known as the optical biometric sensors. Fingerprint sensors have a plurality of photoelectric conversion elements and other elements arrayed on a substrate.

The output signal of the photoelectric conversion elements changes according to the amount of light irradiated thereon.

BRIEF DESCRIPTION OF THE DRAWINGS

FIG. 8 is a plan view showing another configuration example of the substrate in the embodiment.

FIG. 14 is a cross-sectional view showing another configuration example of the substrate in the embodiment.

DETAILED DESCRIPTION

Figure 1:
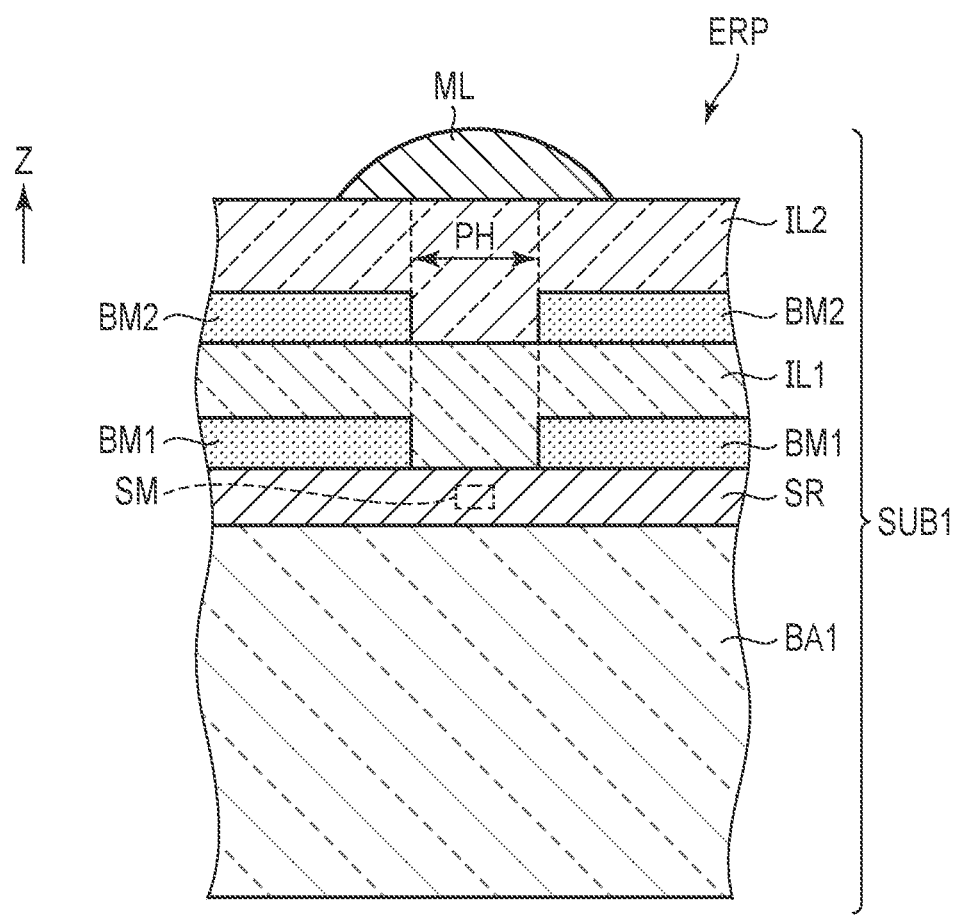
FIG. 1 is a schematic cross-sectional view of a part of an electronic device of an embodiment.

In general, according to one embodiment, an electronic device comprises a substrate; a plurality of sensor regions, each having a plurality of sensor elements on the substrate; a plurality of microlenses arranged in a hexagonal periodic structure over the plurality of sensor elements in a first direction and a second direction that intersect each other, and provided in the plurality of sensor regions; and a plurality of spacers arranged on the substrate and between the plurality of sensor regions, wherein the plurality of sensor regions include a first sensor region adjacent to the plurality of spacers, a second sensor region adjacent to the first sensor region in the first direction, and a third sensor region adjacent to the first sensor region in the second direction, and include at least one microlens overlapped with the first sensor region and the second sensor region, and at least one microlens overlapped with the first sensor region and the third sensor region.

The purpose of the present embodiment is to provide an electronic device capable of securing a sufficient region to provide a spacer, preventing an area of microlenses from becoming smaller, and preventing reduction in sensor performance.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Hereinafter, an electronic device according to an embodiment will be described in detail with reference to the drawings.

In the present embodiment, a first direction X, a second direction Y, and a third direction Z are orthogonal to each other; however, they may also intersect at an angle other than 90°. A direction toward a distal end of an arrow in the third direction Z is defined as up or above, and a direction opposite to the direction toward the distal end of the arrow in the third direction Z is defined as down or below. Note that, the first direction X, the second direction Y, and the third direction Z may also be referred to as an X direction, a Y direction, and a Z direction.

Furthermore, in a case of expressions such as "a second member above a first member" and "a second member below a first member", the second member may be in contact with the first member or may be located away from the first member. In the latter case, a third member may be interposed between the first and second members. On the other hand, in a case of expressions such as "a second member on a first member" and "a second member under a first member", the second member is in contact with the first member.

Furthermore, when an observation position for observing an electronic device is on a distal end side of an arrow in the third direction Z, a planar view refers to a view from this observation position toward an X-Y plane defined by the first direction X and the second direction Y. A cross-sectional view refers to a view of a cross section of the electronic device in an X-Z plane defined by the first direction X and the third direction Z, or a Y-Z plane defined by the second direction Y and the third direction Z.

Embodiment

FIG. 1 is a schematic cross-sectional view of a part of an electronic device of an embodiment. An electronic device ERP comprises a base material BA1, a sensor layer SR, a light-shielding layer BM1, an insulating layer IL1, a light-shielding layer BM2, an insulating layer IL2, and a microlens ML.

The base material BA1 is formed of a transparent insulating material such as glass. The sensor layer SR is provided on the base material BA1. A sensor element SM, which configures an optical fingerprint sensor, is provided in the sensor layer SR. The sensor element SM is a photoelectric conversion element, for which, for example, a semiconductor photodiode or an organic photodiode (OPD) is used.

The light-shielding layer BM1 and the insulating layer IL1 are provided in contact with the base material BA1. Two adjacent BM1s are arranged with a gap therebetween. The light-shielding layer BM1 is formed, for example, of a metallic material, more specifically, a laminated film of aluminum sandwiched between molybdenum. However, instead of a metallic material, the light-shielding layer BM1 may be formed using an organic insulating resin material with a planarization function or a photosensitive resin material.

The insulating layer IL1 is provided in contact with the base material BA1 and the light-shielding layer BM1, and covers the light-shielding layer BM1. The insulating layer IL1 is formed of a resin material having translucency.

The light-shielding layer BM2 and the insulating layer IL2 are provided in contact with the insulating layer IL1. The light-shielding layer BM2 is overlapped with the light-shielding layer BM1 with the insulating layer IL1 sandwiched therebetween. Two adjacent BM2s are arranged with a gap therebetween. The material of the light-shielding layer BM2 is the same as that of the light-shielding layer BM1.

The insulating layer IL2 is provided in contact with the insulating layer IL1 and the light-shielding layer BM2 and covers the light-shielding layer BM2. The material of the insulating layer IL2 may be the same as that of the insulating layer IL1, or may be a base material having translucency such as glass.

The gap between two adjacent light-shielding layers BM1 and the gap between two adjacent light-shielding layers BM2 form a pinhole PH. Note that, in FIG. 1, the two light-shielding layers of the same layer are adjacent to each other, and the pinhole PH is provided between the two. However, the light-shielding layers and the pinhole of the present embodiment are not limited thereto. A plurality of pinholes PH may be provided in an integrally formed light-shielding layer. That is, the two adjacent light-shielding layers may continuously form one light-shielding layer.

The microlens ML is provided in contact with the insulating layer IL2. The microlens ML is overlapped with the sensor element SM via the pinhole PH. A light entering the electronic device ERP through the microlens ML passes through the pinhole PH and reaches the sensor element SM.

A stacked layer body of the base material BA1, the sensor layer SR, the light-shielding layer BM1, the insulating layer IL1, the light-shielding layer BM2, the insulating layer IL2, and the microlens ML is also referred to as a substrate SUB1. In the manufacturing process of the electronic device ERP, there is a step in which the substrates SUB1 are bonded together, and the base material BA1 is polished.

Figure 2:
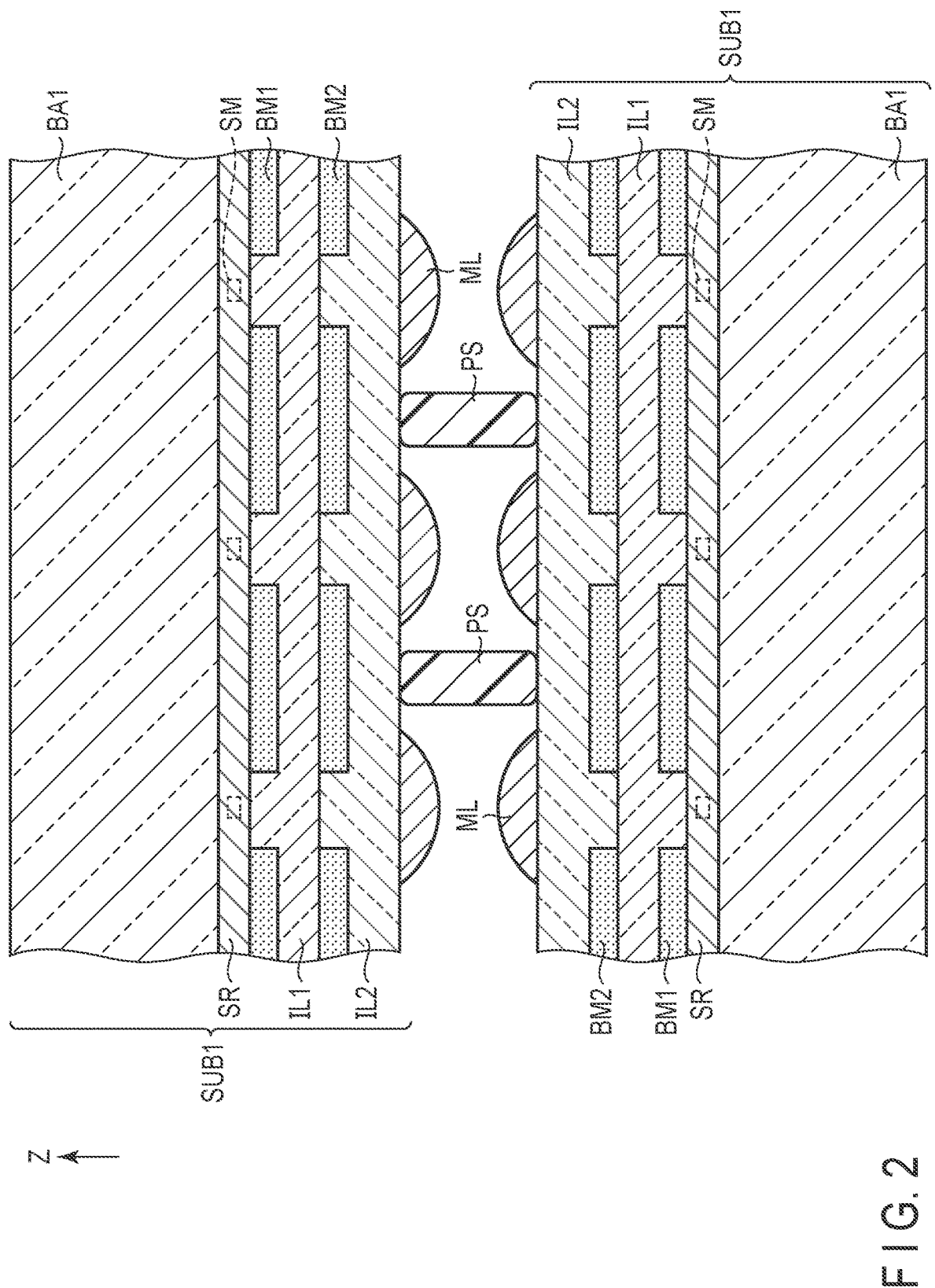
FIG. 2 is a cross-sectional view of two substrates bonded together.

FIG. 2 is a cross-sectional view of the two bonded substrates. A spacer PS is provided between the substrates SUB1 to maintain the spacing therebetween. The spacer PS may be arranged between adjacent microlenses ML. The spacer PS is overlapped with the light-shielding layers BM1 and BM2. The material of the spacer PS may be a resin material, more specifically, an organic insulating resin material or a photosensitive resin material.

By increasing the area of the microlens ML with respect to a sensor region, the sensor performance of the electronic device ERP improves. However, if the area of the microlens ML is increased, a region for the spacer PS decreases. If the region for the spacer PS decreases, it may become difficult to maintain the spacing between the substrates SUB1 in the above polishing process.

If the region for the spacer PS is increased, the area of the microlens ML must be reduced, and the sensor performance of the electronic device ERP is reduced.

In the electronic device ERP of the present embodiment, in a sensor region adjacent to the spacer PS, at least one microlens ML is overlapped with the adjacent sensor region. Such a sensor region includes a microlens ML overlapped with a sensor region adjacent in the first direction X and a microlens ML overlapped with a sensor region adjacent in the second direction Y.

By arranging the microlenses ML in such a way, even in a case where the substrates SUB1 are bonded together and applied a polishing process, a region for providing the spacer PS can be sufficiently secured, and the spacing between the substrates SUB1 can be maintained. This can prevent the area of the microlens ML from becoming smaller, and the sensor performance of the electronic device ERP from being reduced.

Figure 3:
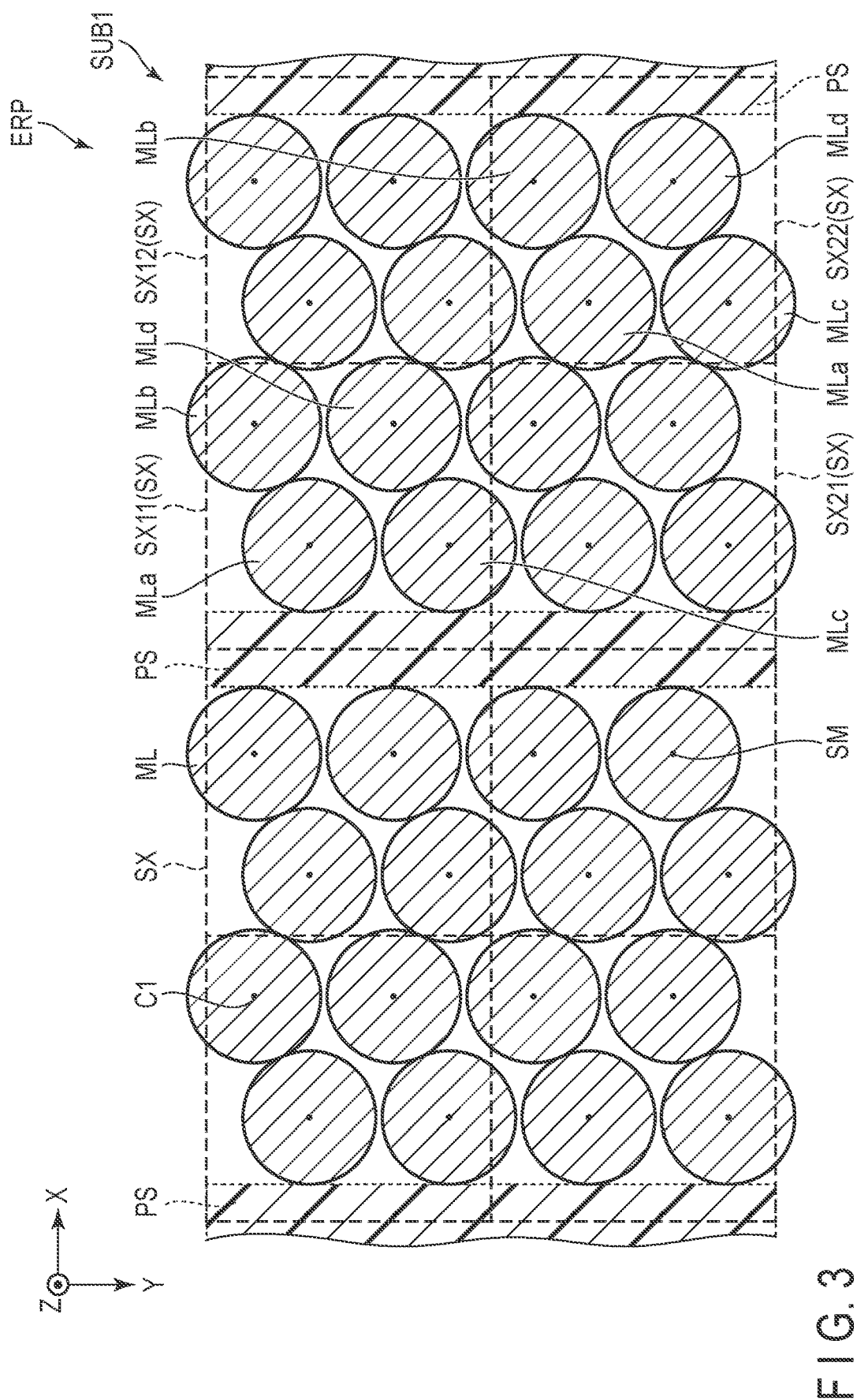
FIG. 3 is a plan view of a substrate of the present embodiment.

FIG. 3 is a plan view of the substrate of the present embodiment. In the substrate SUB1, in planar view, a plurality of microlenses ML are arranged in a hexagonal periodic structure over the first direction X and the second direction Y. The spacer PS has a vertically long rectangular shape. The spacer PS is provided every two sensor regions SX along the first direction X, and extends along the second direction Y. That is, the spacer PS is provided every two rows of sensor regions SX.

The sensor region SX corresponds to a basic unit for determining the sensing definition of the electronic device EPR. In the example shown in FIG. 3, the sensor region SX includes a total of four sensor elements SM; two each in the first direction X and the second direction Y. However, the number of sensor elements SM is not limited thereto, and should be arranged according to the sensor performance. Alternatively, the number and pitch of sensor elements SM can be determined according to the pixel pitch of a display panel to be overlapped with the electronic device ERP. By adjusting the number and pitch of the sensor elements SM and the pixel pitch, more in the display panel can be eliminated. For example, the pitch of the sensor element SM should not be equal to the pixel pitch.

Each of the plurality of sensor elements SM is overlapped with each of the plurality of microlenses ML. In the example shown in FIG. 3, the sensor element SM is overlapped with a center Cl of the microlens ML. However, it is not limited thereto. Therefore, the sensor element SM does not have to be overlapped with the center of microlens ML as long as a light incident on the microlens ML reaches inside the sensor region SX.

The size of the microlens ML may be, for example, half the length of the sensor region SX in each of the first direction X and the second direction Y.

Now, the sensor region SX adjacent to the spacer PS in a direction parallel to the first direction X will be focused. A sensor region SX11 is adjacent to the spacer PS in the opposite direction of the first direction X. The sensor region SX11 contains hexagonally arranged microlens MLa, MLb, MLc, and MLd. The microlenses MLa and MLc are closer to the spacer than the microlenses MLb and MLd in the first direction X.

The microlenses MLb and MLd are overlapped with a sensor region SX12 adjacent in the first direction X. In other words, the microlenses MLb and MLd are overlapped with the sensor region SX12 and the boundary of SX12.

The above description refers to the first direction X, but the same also applies to the second direction Y. The sensor region SX11 is adjacent to a sensor region SX21 in the second direction Y.

The microlens MLb is overlapped with a sensor region adjacent to the sensor region SX11 in the opposite direction of the second direction Y. The microlens MLd is overlapped with the sensor region SX21 in the second direction Y.

For example, the sensor regions SX11, SX12, and SX21 are referred to as a first sensor region, a second sensor region, and a third sensor region, respectively. At least one of the microlenses ML provided in the first sensor region is overlapped with the second sensor region. At least one of the microlenses ML provided in the first sensor region is overlapped with the third sensor region.

A sensor region SX22 is adjacent to the spacer PS in the first direction X. Microlenses MLb and MLd in the sensor region SX22 are closer to the spacer PS than microlenses MLa and MLc in the first direction X.

The microlenses MLa and MLc are overlapped with the sensor region SX21 adjacent in the opposite direction of the first direction X. In other words, the microlenses MLa and MLc are overlapped with the sensor region SX21 and the boundary of SX21.

The microlens MLb in the sensor region SX22 is overlapped with the sensor region SX12 adjacent in the opposite direction of the second direction Y. In other words, the microlens MLb is overlapped with the sensor region SX12 and the boundary of SX22.

However, not all microlenses ML need to be overlapped with adjacent sensor regions. One sensor region adjacent to the spacer PS need only be provided with at least one microlens described below. That is, the above-mentioned one microlens needs to be overlapped with a sensor region adjacent in the first direction X. Furthermore, at least one microlens provided in the above-mentioned one sensor region needs to be overlapped with the sensor region adjacent in the second direction Y. The microlens overlapped with the sensor region adjacent in the first direction X and the microlens overlapped with the sensor region adjacent in the second direction Y may be different or the same. FIG. 3 shows an example where the microlenses overlapped in the first direction X and the second direction Y are different.

Figure 4:
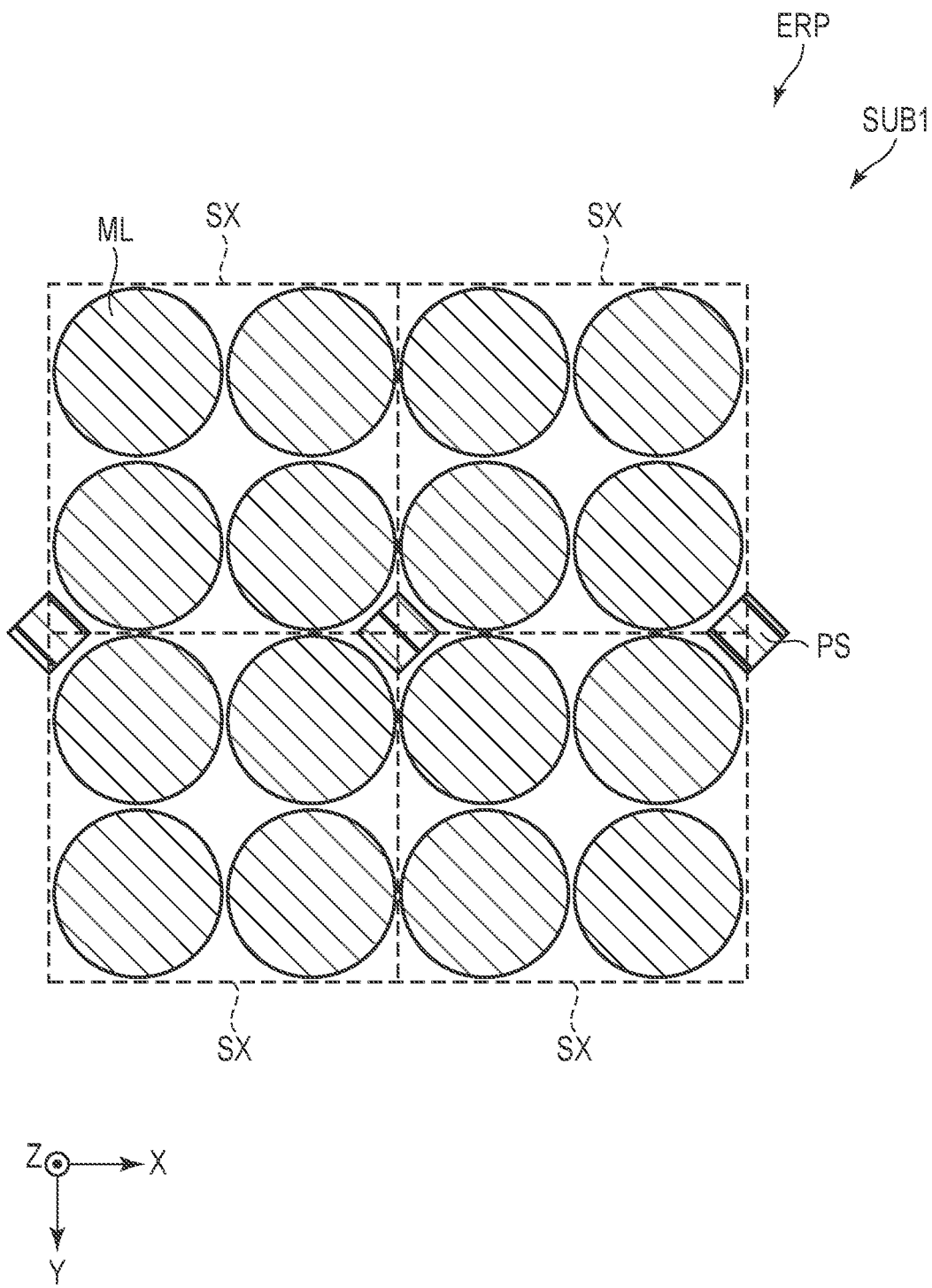
FIG. 4 is a plan view of a substrate of comparative example 1.

FIG. 4 is a plan view of a substrate of comparative example 1. In FIG. 4, microlenses ML are provided along the first direction X and the second direction Y in a matrix. The microlenses ML provided in one sensor region SX are not overlapped with adjacent sensor regions SX.

A rhombus-shaped spacer PS is provided between four adjacent microlenses ML. Compared to the spacer PS shown in FIG. 3, the spacer PS in FIG. 4 is shorter in the distance (width) along the first direction X. In addition, since the spacer PS in FIG. 4 does not extend along the second direction Y, it is obvious that the area thereof is smaller than the spacer PS in FIG. 3.

Figure 5:
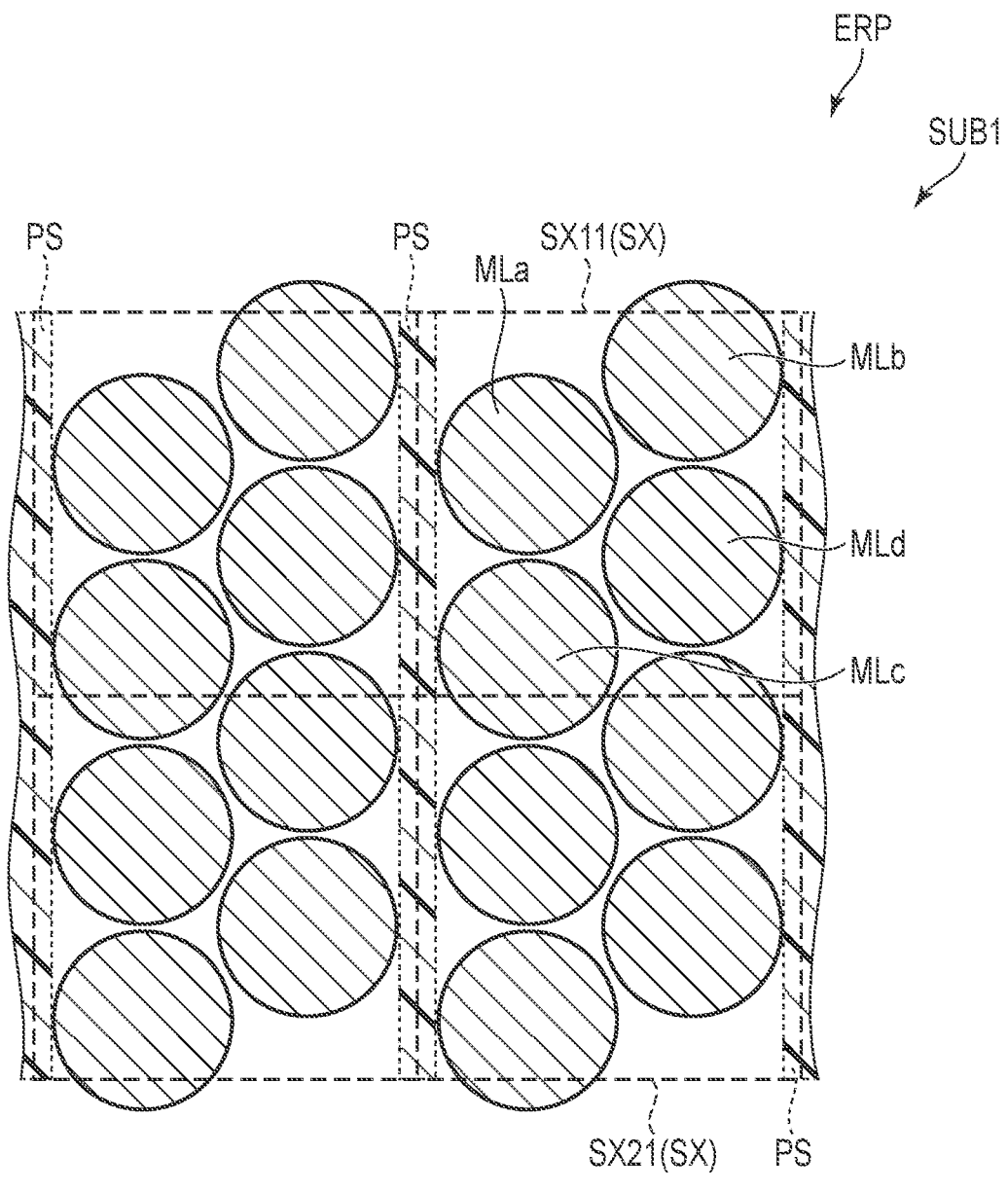
FIG. 5 is a plan view of a substrate of comparative example 2.

FIG. 5 is a plan view of a substrate of comparative example 2. In a substrate SUB1 shown in FIG. 5, microlenses ML are hexagonally arranged. One sensor region SX is provided between two spacers PS in the first direction X. The spacers PS extend along the second direction Y.

In FIG. 5, microlenses ML provided in one sensor region SX are overlapped with the sensor regions adjacent in the second direction Y. However, the microlenses ML provided in one sensor region SX are not overlapped with the sensor regions SX adjacent in the first direction X.

Microlense MLc provided in a sensor region SX11 is overlapped with a sensor region SX21 adjacent in the second direction Y. However, the sensor region SX11 is not adjacent to any other sensor region in the first direction X. That is, none of microlenses MLa, MLb, MLc, and MLd provided in the sensor region SX11 is overlapped with the sensor regions SX adjacent in the first direction X.

In the substrate SUB1 of the present embodiment, the sensor region SX adjacent to the spacer PS includes microlenses overlapped with sensor regions adjacent in both the first direction X and the second direction Y. This allows to secure a region for providing the spacer PS, and also to prevent the area of the microlens ML from being reduced. Therefore, it is possible to prevent the sensor performance of the electronic device ERP from being reduced.

Configuration Example 1

Figure 6:
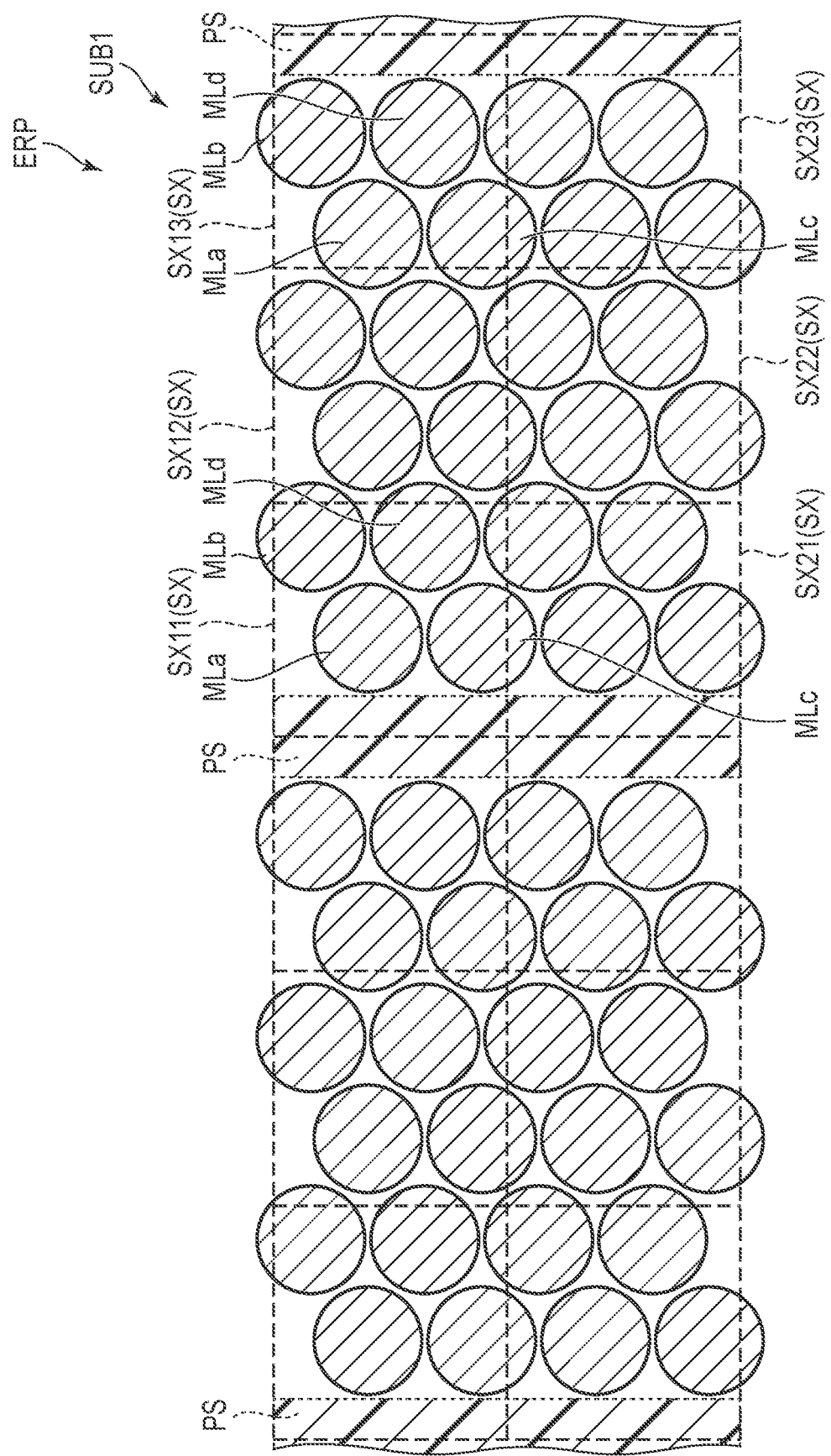
FIG. 6 is a plan view showing another configuration example of the substrate in the embodiment.

FIG. 6 is a plan view of another configuration example of the substrate in the embodiment. The configuration example shown in FIG. 6 differs from the configuration example shown in FIG. 3 in that a spacer is provided for every three rows of sensor regions.

In the present configuration example, sensor regions SX adjacent to spacers PS include microlenses overlapped with sensor regions adjacent in both the first direction X and the second direction Y.

For example, the arrangement of microlenses ML in a sensor region SX11 in FIG. 6 is the same as that in FIG. 3.

A sensor region SX23 in FIG. 6 is the same as the sensor region SX22 in FIG. 3.

In sensor regions SX12 and SX22 that are not adjacent to the spacer PS, the microlenses ML are overlapped with the sensor regions adjacent in the second direction Y, but are not overlapped with the sensor regions adjacent in the first direction X.

However, as described above, a region for providing the spacer PS can be secured by the sensor region adjacent to the spacer PS.

FIG. 6 describes an example where the number of rows of the sensor region SX provided between adjacent spacers PS is three. The number of rows may not only be two as shown in FIG. 3 and three as shown in FIG. 6, but may also be four or more. However, in the case where the number of rows is one, the arrangement shown in FIG. 5 will be applied. In such a case, it is preferable to provide at least two rows of sensor regions SX between the adjacent spacers PS.

The present configuration example also has the same effect as the embodiment.

Configuration Example 2

Figure 7:
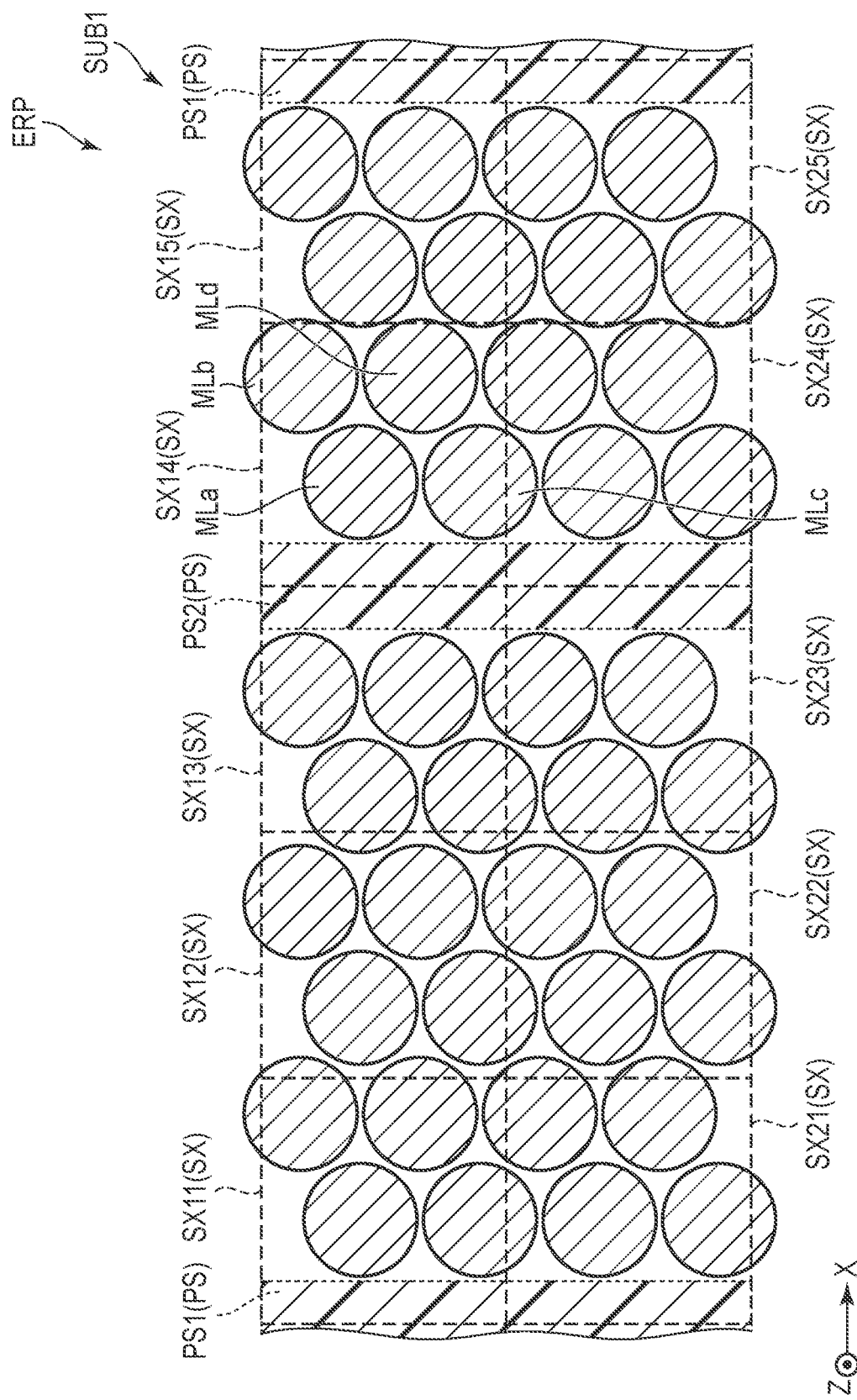
FIG. 7 is a plan view showing another configuration example of the substrate in the embodiment.

FIG. 7 is a plan view of another configuration of the substrate in the embodiment. The configuration example shown in FIG. 7 differs from the configuration example shown in FIG. 6 in that the number of rows of sensor regions provided between adjacent spacers is not uniform.

In the example shown in FIG. 7, spacers PS1 and PS2 are provided as the spacer PS. Between the spacers PS1 and PS2, three rows of sensor regions SX are provided. Between the spacers PS2 and PS1, two rows of sensor regions SX are provided. That is, unlike FIG. 6, the number of rows of the sensor region SX provided between the spacers PS is not uniform. Spacers PS1, PS2, and PS3 may sometimes be referred to as a first spacer, a second spacer, and a third spacer.

FIG. 7 describes an example of providing three rows and two rows of sensor regions SX between the spacers PS, but the present configuration example is not limited thereto. It is possible to provide other number of rows of sensor regions SX.

In the present configuration example, the sensor regions SX adjacent to the spacers PS include microlenses that are overlapped with the sensor regions adjacent in both the first direction X and the second direction Y.

The present configuration example also has the same effect as the embodiment.

Configuration Example 3

FIG. 8 is a plan view of another configuration of the substrate in the embodiment. The configuration example shown in FIG. 8 differs from the configuration example shown in FIG. 3 in that the planar shape of the spacer is circular.

In the example shown in FIG. 8, two rows of sensor regions SX are provided between the spacers PS adjacent to each other in the first direction. For example, sensor regions SX111 and SX112 are provided between spacers PS11 and PS12. Sensor regions SX211 and SX212 are provided between spacers PS12 and PS13.

The spacer PS12 is provided between microlenses MLb and MLd in the sensor region SX112 and microlenses MLa and MLc in the sensor region SX211. As described above, the spacer PS12 has a circular shape in planar view, and is actually cylindrical extending along the third direction Z. Thus, unlike the spacer PS of the embodiment, the spacer PS of the present configuration example has a shape that does not extend along the second direction Y.

The spacers PS11 and PS13 are also arranged in the same manner as the spacer PS12.

A spacer PS22 that is adjacent to the spacer PS12 in the second direction Y is provided between microlenses MLb and MLd in a sensor region SX122 and microlenses MLa and MLc in a sensor region SX221.

In FIG. 8, one spacer PS is provided between two sensor regions SX adjacent in the first direction X, but the present configuration example is not limited thereto. Two or more spacers PS may also be provided between the two sensor regions SX.

A light-shielding layer BM2 is provided between the microlenses ML in planar view. The light-shielding layer BM2 is also provided in a region overlapped with the spacer PS.

Figure 9:
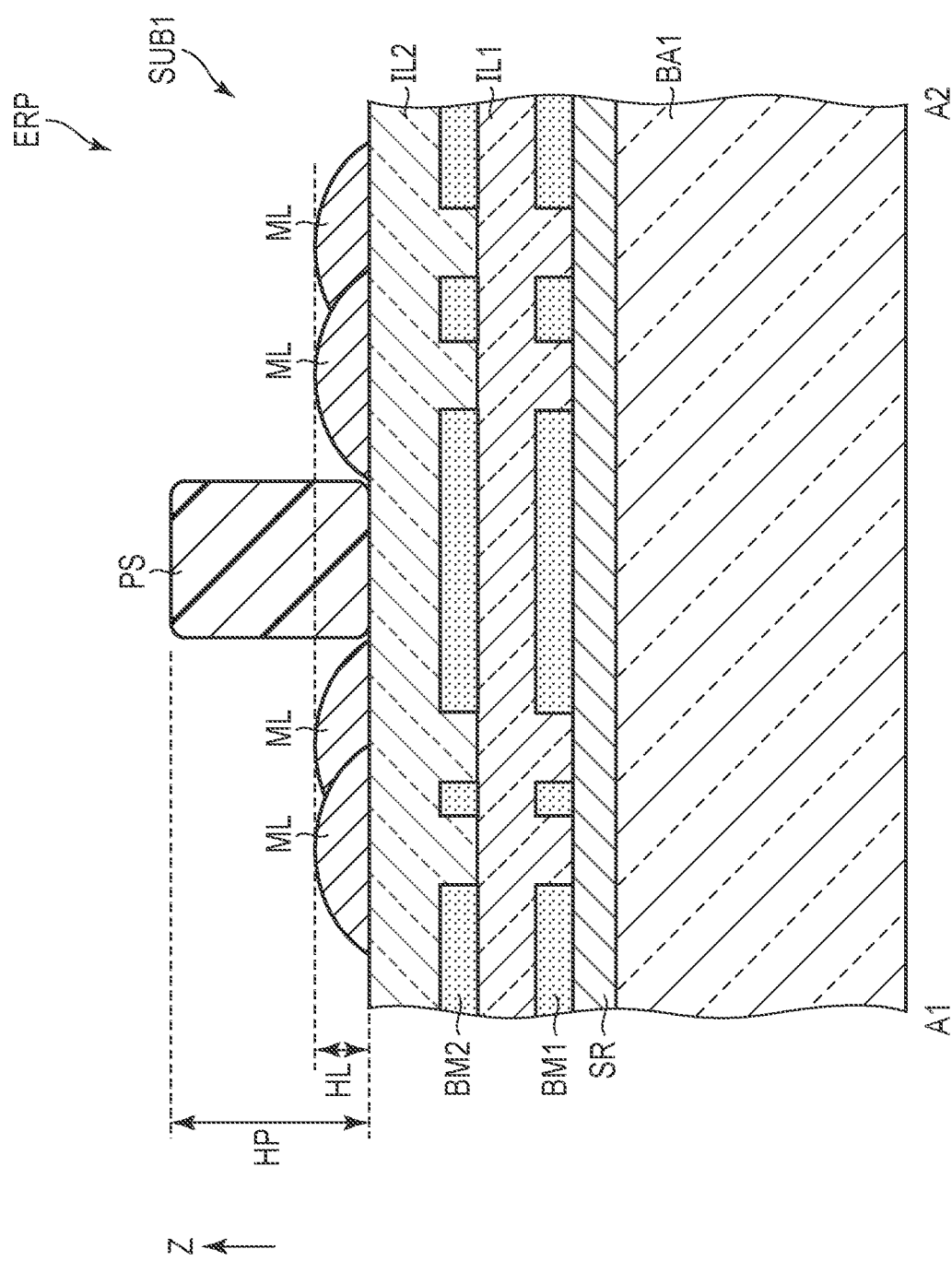
FIG. 9 is a cross-sectional view of the substrate along line A1-A2 of FIG. 8.

FIG. 9 is a cross-sectional view of the substrate along line A1-A2 in FIG. 8. For clarity, line A1-A2 in FIG. 8 is shown in a manner divided into several lines.

As shown in FIG. 9, a height HP of the spacer PS along the third direction Z is higher than a height HL of the microlenses ML. As a result, the microlenses ML do not come in contact with each other during the polishing process. Therefore, there is no risk of damaging the microlenses ML.

Furthermore, the cross-sectional shape of the spacers PS between the substrates SUB1 to be bonded may be different.

Figure 10:
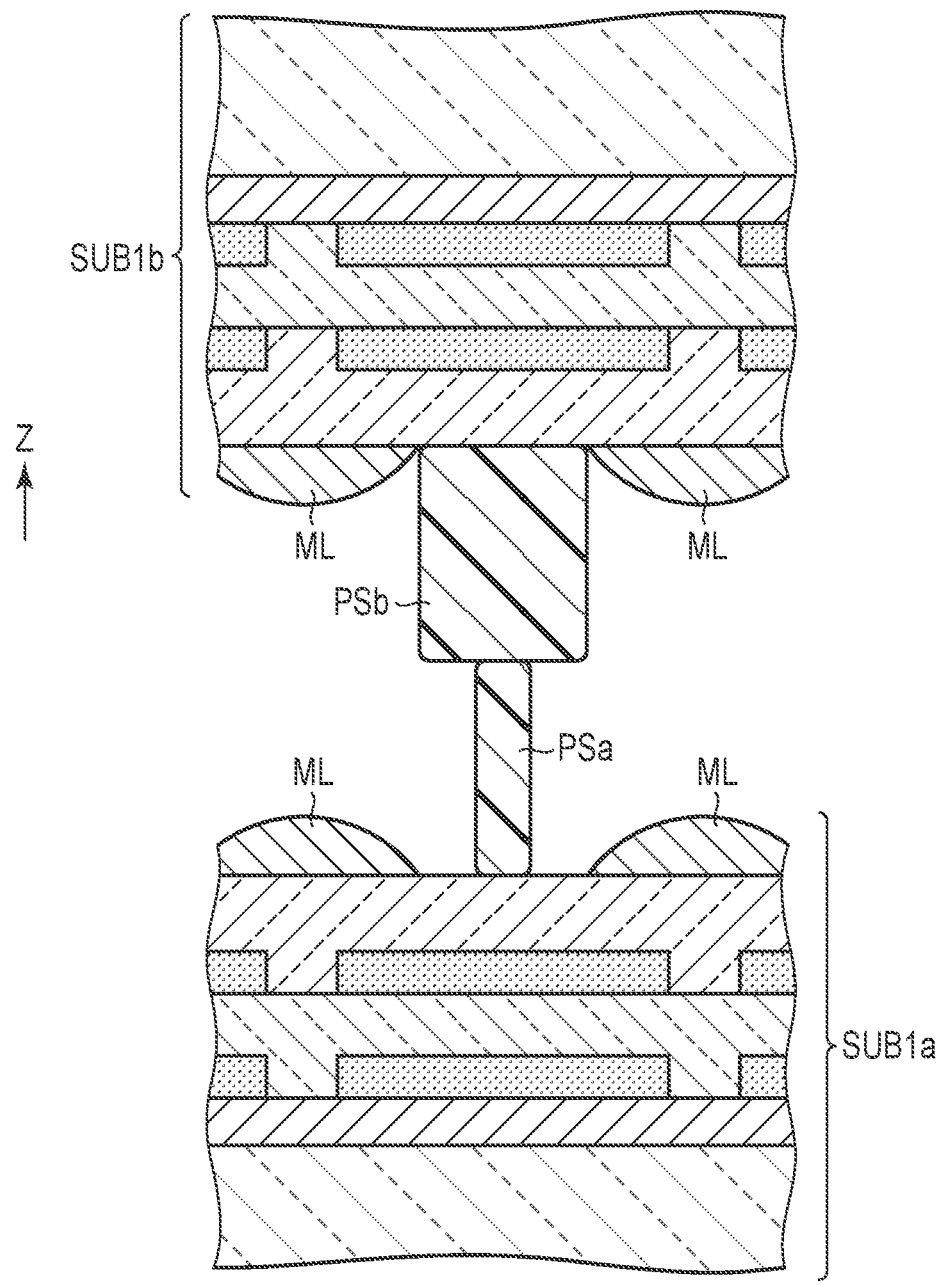
FIG. 10 is a cross-sectional view of two substrates bonded together.

FIG. 10 is a cross-sectional view of two substrates bonded together. The cross-sectional shapes of a spacer PSa provided on a substrate SUB1a and a spacer PSb provided on a substrate SUB1b are different. In the substrates SUB1a and SUB1b, other components have the same shapes. The different cross-sectional shapes of the spacers PSa and PSb improve the bonding strength.

Also, for example, in the case of bonding spacers PS having different lengths in the first direction X and the second direction Y together, one of the substrates SUB1 to be bonded may be arranged by being rotated 90° on the same plane as the other substrate. Although the same substrate SUB1 is used, the configuration becomes similar to that shown in FIG. 10.

Figure 11:
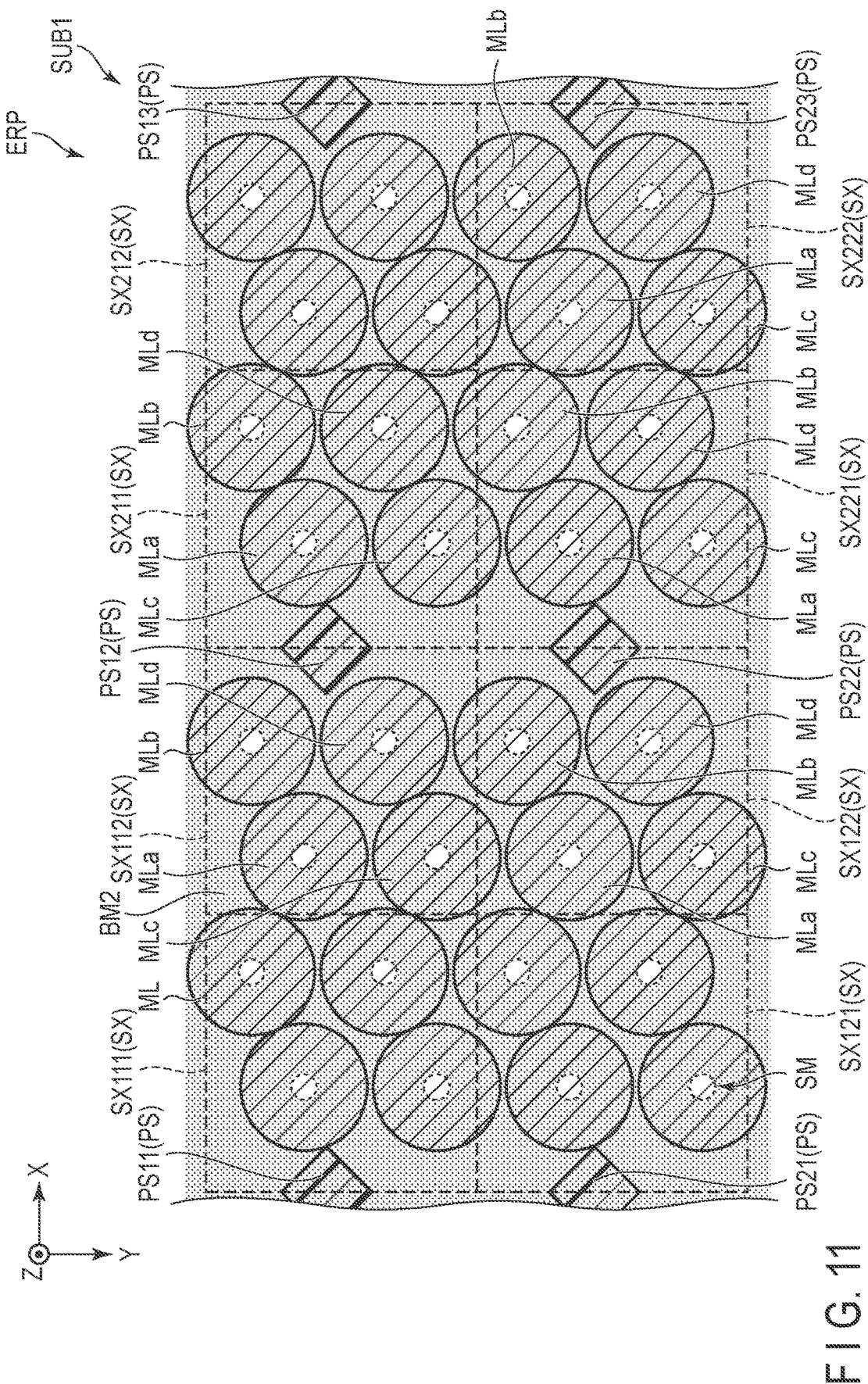
FIG. 11 is a plan view showing another configuration example of the substrate in the embodiment.

FIG. 11 is a plan view of another configuration example of the substrate in the embodiment. The configuration example shown in FIG. 11 differs from the configuration example shown in FIG. 8 in that the planar shape of the spacer is rhombic.

The spacer PS shown in FIG. 11 actually has a rhombus pillar shape extending along the third direction Z. As described above, in the present configuration example, in addition to a spacer PS having a circular shape in a cross-sectional view and a cylindrical shape in XYZ space, a spacer PS having other shapes can also be used.

Figure 12:
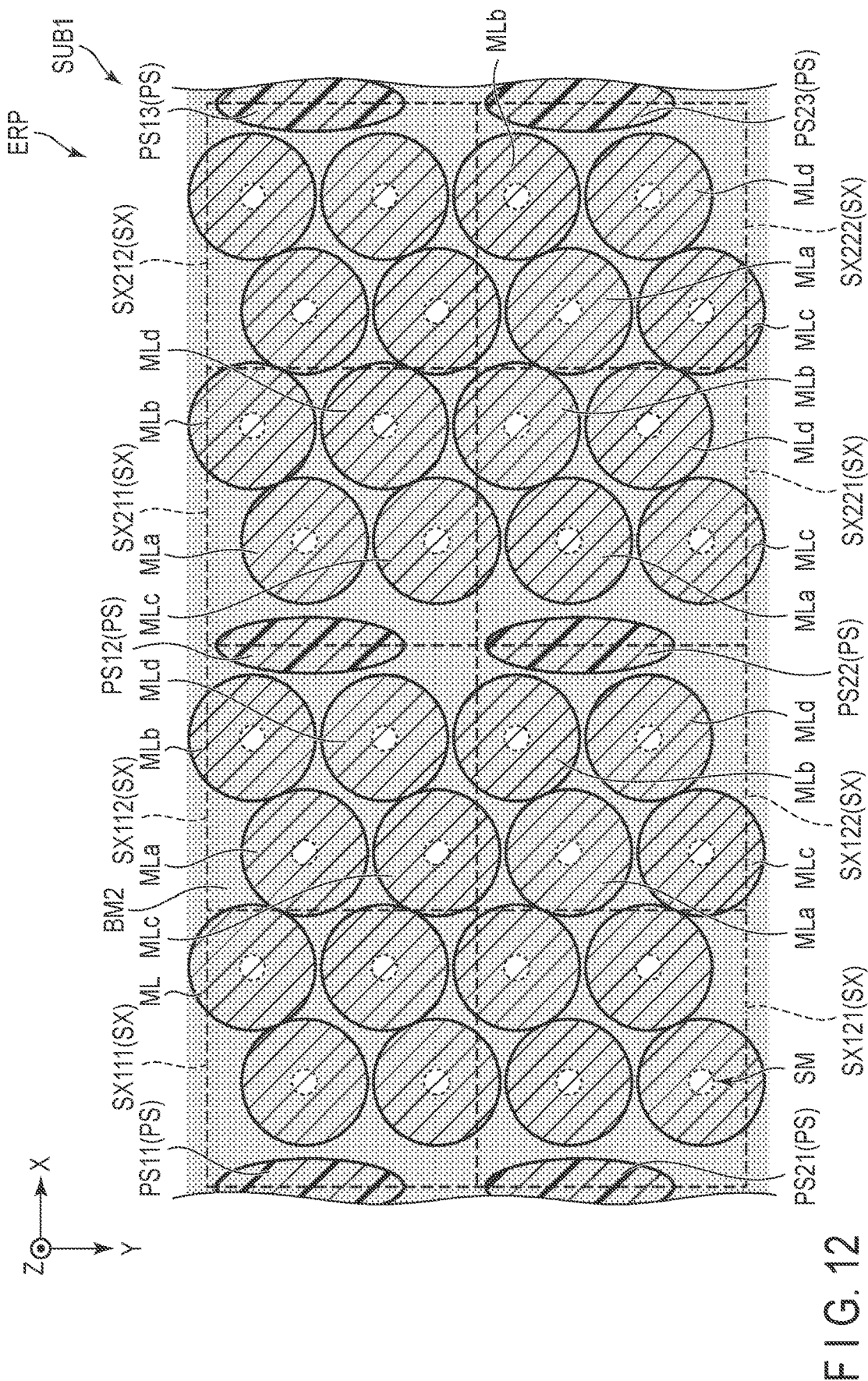
FIG. 12 is a plan view showing another configuration example of the substrate in the embodiment.

FIG. 12 is a plan view of another configuration example of the substrate in the embodiment. The configuration example shown in FIG. 12 differs from the configuration example shown in FIG. 8 in that the planar shape of the spacer is elliptical.

The spacer PS shown in FIG. 12 actually has an elliptical pillar shape extending along the third direction Z. In the spacer PS, an elliptical long axis is arranged along the second direction Y, and an elliptical short axis is arranged along the first direction X. The spacer PS has a so-called vertically long elliptical shape. As described above, the spacer PS extends in the second direction Y for a predetermined length, but does not have to extend over the entire sensor region SX.

Figure 13:
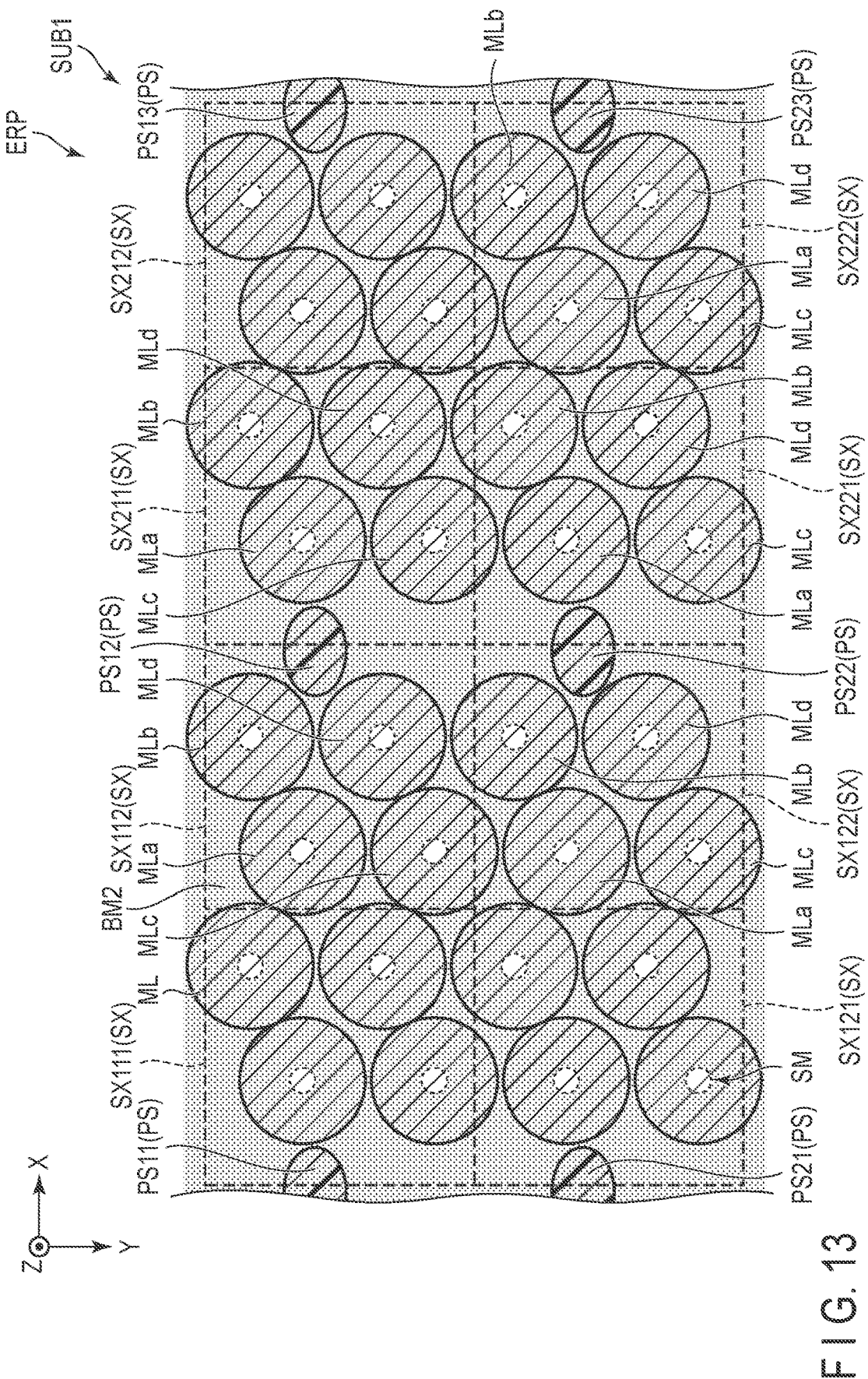
FIG. 13 is a plan view showing another configuration example of the substrate in the embodiment.

FIG. 13 is a plan view of another configuration of the substrate in the embodiment. The configuration example shown in FIG. 11 differs from the configuration example shown in FIG. 8 in that the planar shape of the spacer is a horizontally long elliptical shape.

In the cross-sectional shape of the spacer PS shown in FIG. 13, an elliptical long axis is arranged along the first direction X. An elliptical short axis is arranged along the second direction Y.

The spacer PS shown in FIG. 12 and the spacer PS shown in FIG. 13 may be used for each substrate SUB1 to be bonded. For example, the spacer PS shown in FIG. 12 may be used as the spacer PSa shown in FIG. 10, and the spacer PS shown in FIG. 13 may be used as the spacer PSb shown in FIG. 10.

The present configuration example also has the same effect as the embodiment.

Configuration Example 4

FIG. 14 is a cross-sectional view of another configuration example of the substrate in the embodiment. The configuration example shown in FIG. 14 differs from the configuration example shown in FIG. 9 in that a spacer is provided on a base formed of a lens material.

The spacer PS in FIG. 14 is provided on a base DZ formed of the same material as the microlens ML. The height of the base DZ is the same as the height HL of the microlens ML.

The combined height of the base DZ and the spacer PS is the same as the height HP of the spacer PS in FIG. 9. That is, the spacer PS needs to be formed for only a height (HP-HL). This allows the height of the spacer PS to be reduced. Note that, since the spacer PS and the base DZ together function as a spacer, they may be referred to as a spacer together.

The present configuration example also has the same effect as the embodiment.

Configuration Example 5

Figure 15:
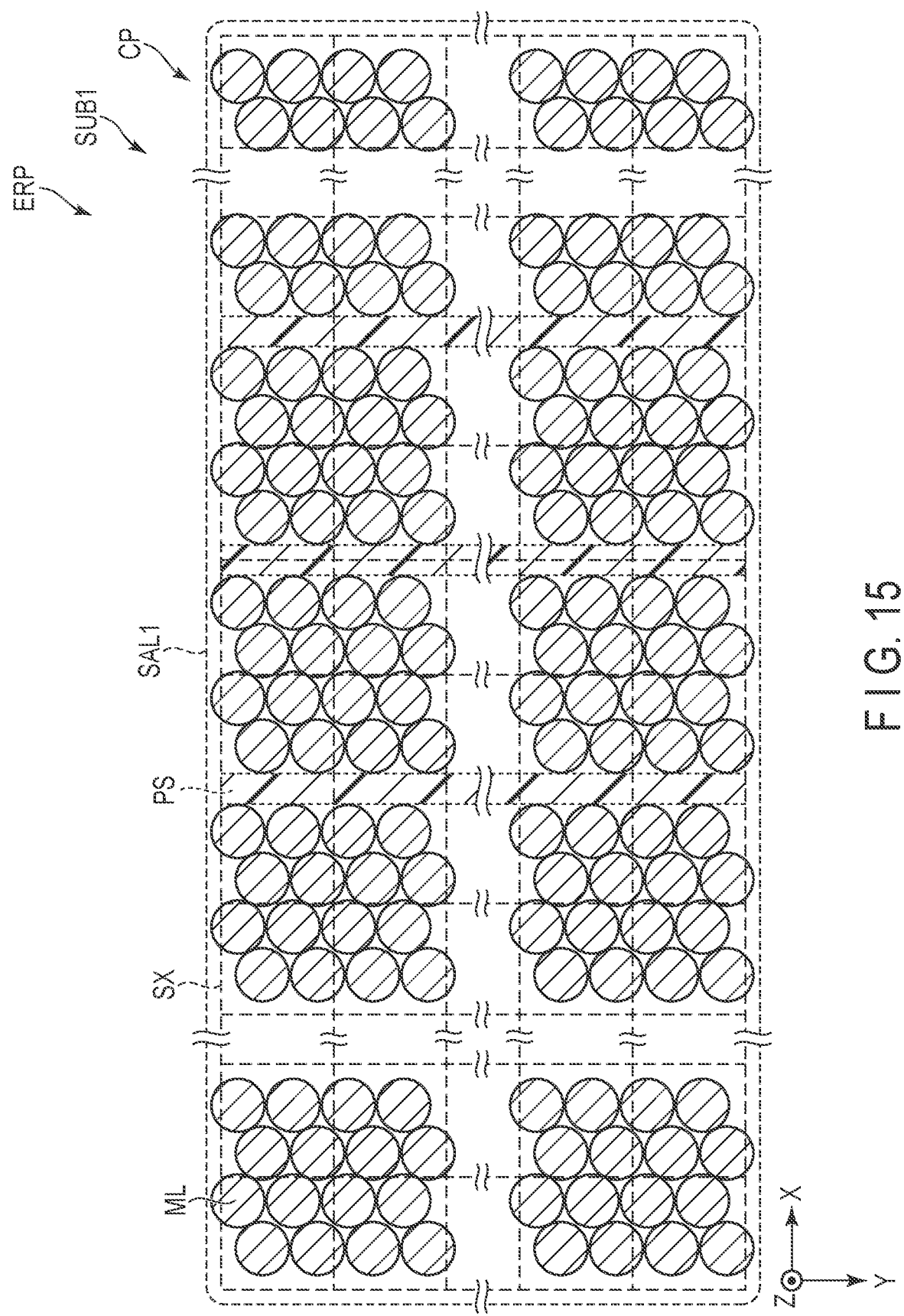
FIG. 15 is a plan view showing another configuration example of the substrate in the embodiment.

FIG. 15 is a plan view of another configuration example of the substrate in the embodiment. The configuration example shown in FIG. 15 describes a configuration in which the microlens is not overlapped with an outer peripheral seal.

The electronic device ERP shown in FIG. 15 is formed using the substrate SUB1 shown in FIG. 3. However, the electronic device ERP is not limited thereto and can be formed using any of the substrates SUB1 described above.

The substrate SUB1 provided in one electronic device ERP is also referred to as a chip CP. The chip CP is covered by an outer peripheral seal SAL1. Microlenses ML provided on one chip CP may extend outside of a sensor region SX, but would not be overlapped with the outer peripheral seal SAL1.

Figure 16:
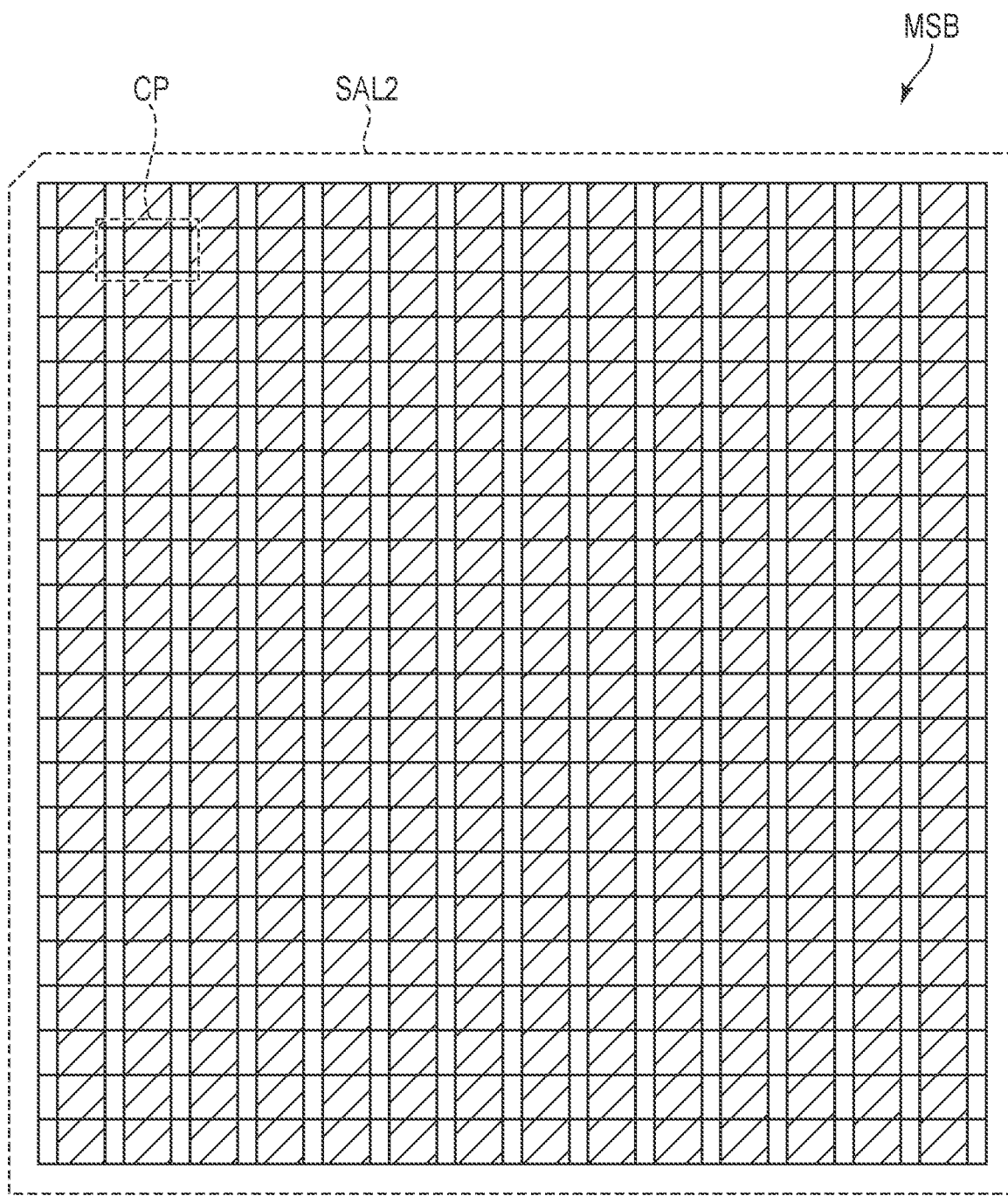
FIG. 16 is a plan view illustrating an outer peripheral seal of a motherboard that is bonded during a polishing process.

FIG. 16 is a plan view illustrating the outer peripheral seal of a motherboard, which is bonded together during the polishing process. A plurality of regions that later become chips CP are provided on a motherboard MSB.

During the polishing process described above, an outer peripheral seal SAL2 is attached to the motherboard MSB to protect the surface of the motherboard MSB. After the polishing process is completed, the motherboard MSB is divided into each of the plurality of regions to form a plurality of chips CP. The outer peripheral seal SAL2 is divided in the attached state and becomes the outer peripheral seal SAL1.

Also in the motherboard MSB, the microlenses provided in each of the plurality of regions (chip CP) are not overlapped with the outer peripheral seal SAL2.

The present configuration example also has the same effect as the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a substrate;
a plurality of sensor regions, each having a plurality of sensor elements on the substrate;
a plurality of microlenses arranged in a hexagonal periodic structure over the plurality of sensor elements in a first direction and a second direction that intersect each other, and provided in the plurality of sensor regions; and
a plurality of spacers arranged on the substrate and between the plurality of sensor regions, wherein
the plurality of sensor regions include a first sensor region adjacent to the plurality of spacers, a second sensor region adjacent to the first sensor region in the first direction, and a third sensor region adjacent to the first sensor region in the second direction, and include at least one microlens overlapped with the first sensor region and the second sensor region, and at least one microlens overlapped with the first sensor region and the third sensor region,
the plurality of spacers include a first spacer, a second spacer, and a third spacer, and
the number of rows of the sensor regions between the first spacer and the second spacer, and the number of rows of the sensor regions between the second spacer and the third spacer are different.

2. The electronic device according to claim 1, wherein the plurality of spacers each have a rectangular shape.

3. The electronic device according to claim 1, wherein the plurality of spacers each have a rhombic shape.

4. The electronic device according to claim 1, wherein the plurality of spacers each have a circular shape.

5. The electronic device according to claim 1, wherein the plurality of spacers each have an elliptical shape.

6. The electronic device according to claim 1, wherein at least two rows of the sensor regions are provided between the plurality of adjacent spacers.

7. The electronic device according to claim 1, wherein the plurality of sensor elements configure an optical fingerprint sensor.

8. The electronic device according to claim 1 further comprising:
a light-shielding layer; and
a plurality of pinholes provided in the light-shielding layer, wherein
the plurality of microlenses are overlapped with the plurality of sensor elements via the plurality of pinholes.

9. The electronic device according to claim 1, wherein the plurality of spacers are each formed of a resin material.

10. The electronic device according to claim 1, wherein the plurality of spacers are each formed on a base formed of a lens material.

* * * * *